UNITED STATES PATENT OFFICE.

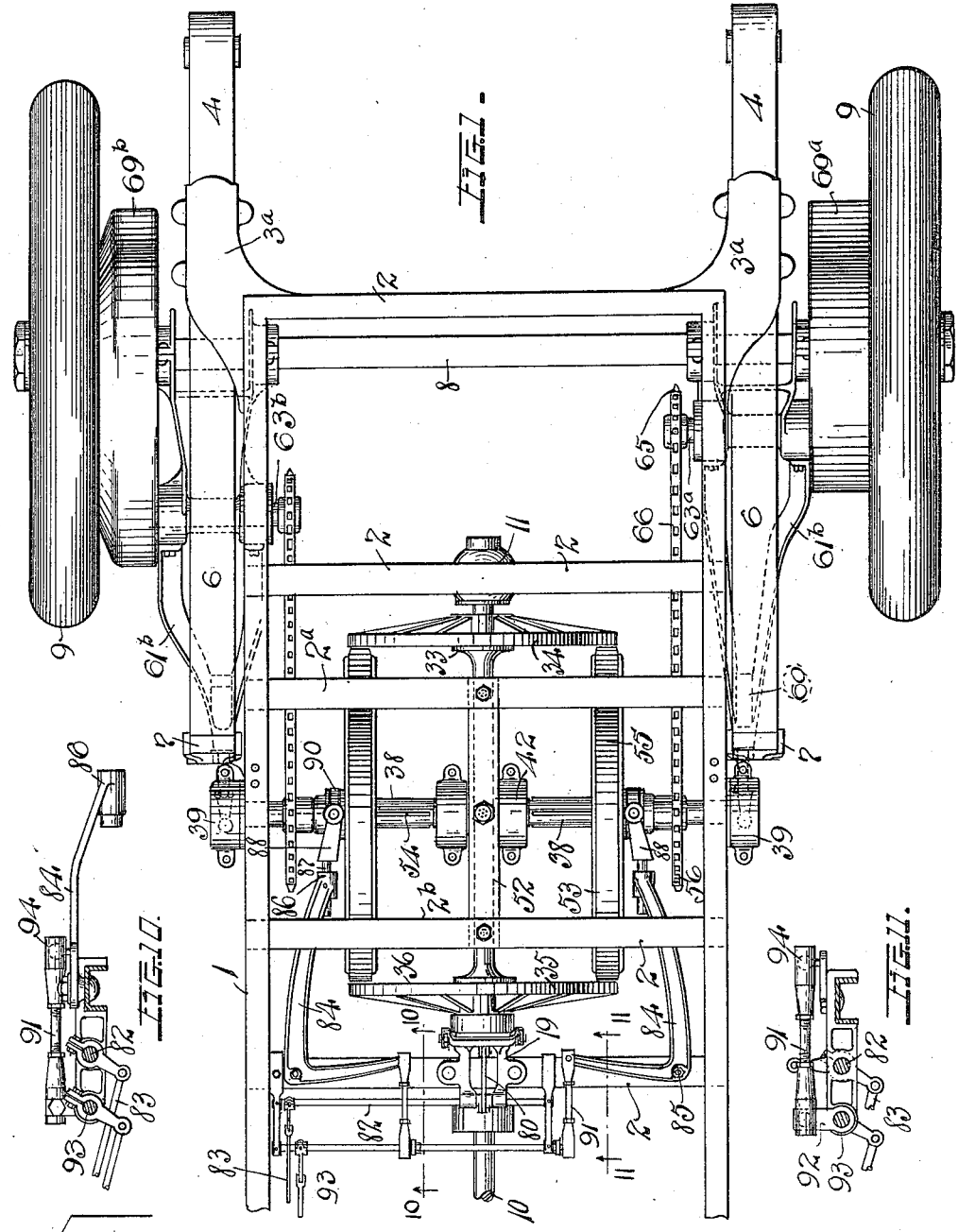

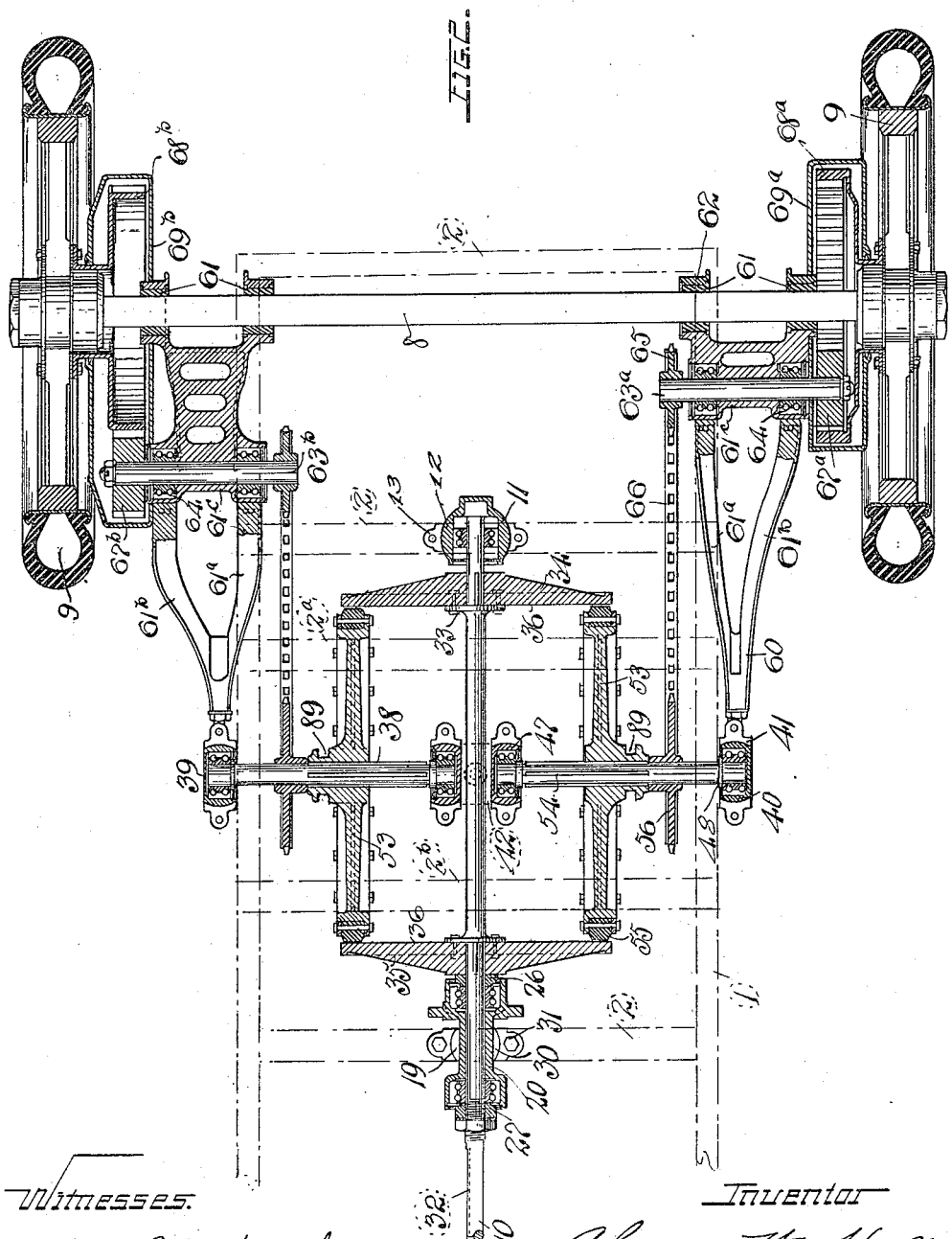

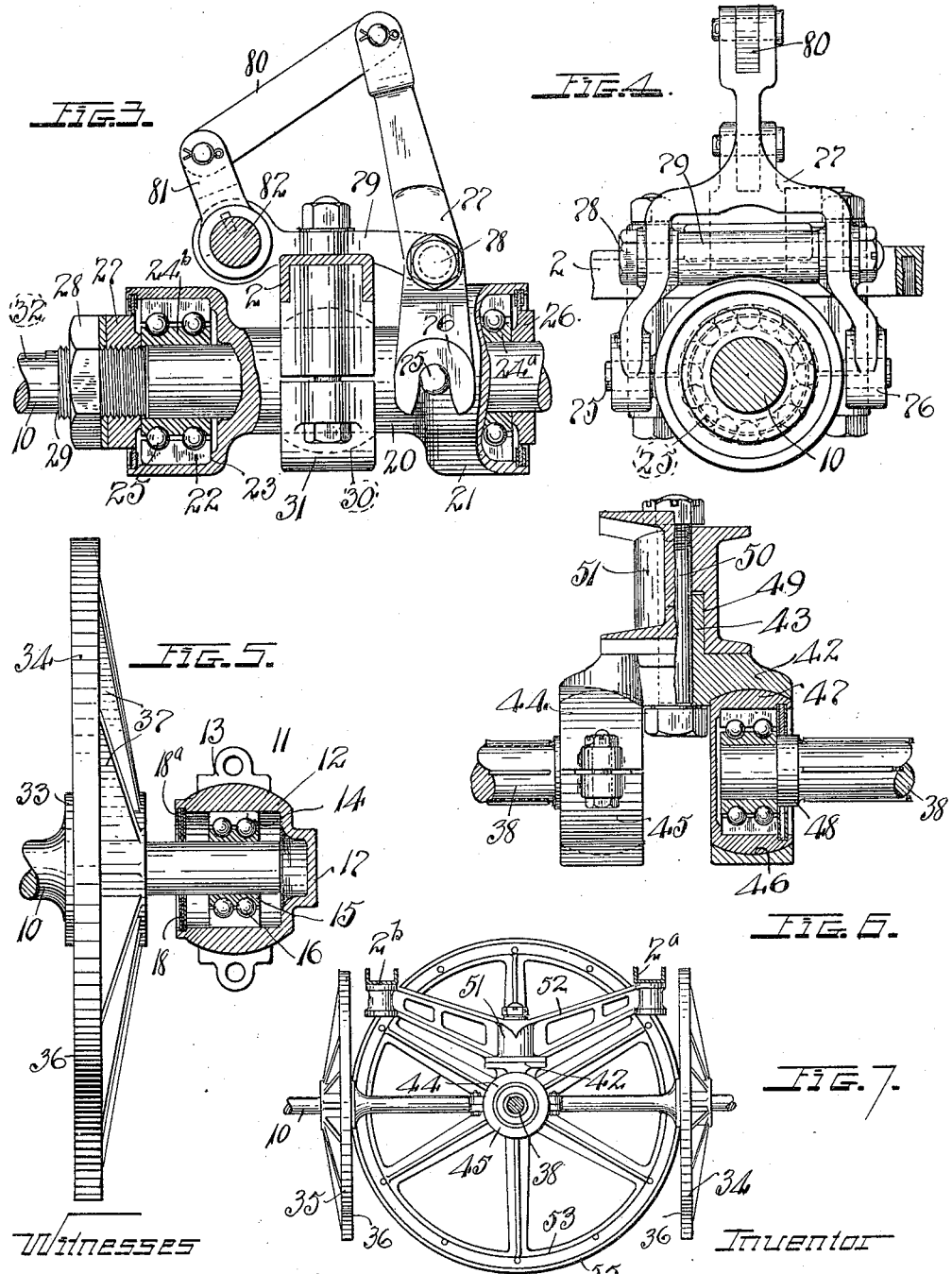

ALONZO W. HALL, OF PLYMOUTH, OHIO.

DRIVING-GEARING FOR VEHICLES.

1,230,153.  Specification of Letters Patent.  Patented June 19, 1917.

Application filed May 4, 1911. Serial No. 625,031.

*To all whom it may concern:*

Be it known that I, ALONZO W. HALL, a citizen of the United States, residing at Plymouth, in the county of Richland and State of Ohio, have invented a certain new and useful Improvement in Driving-Gearing for Vehicles, of which the following is a full, clear, and exact description, reference being had to the accompanying drawings.

This invention relates to self propelled vehicles of all kinds and particularly to automobiles and has for its object the provision of a self adjusting, automatically equalizing, friction disk drive which shall be simple in construction and noiseless and efficient in operation. Many of the advantages of a friction disk transmission have long been known in a theoretical way but have never been practically realized for various reasons. Among these reasons have been the tendency of the friction plate to wear unevenly; the theoretically simple but practically difficult operation of reversing; the difficulty of obtaining a uniform or balanced degree of pressure between the friction members; and the difficulty of maintaining a constant and uniform driving engagement between the rotating members in spite of the distortion and vibration of the vehicle frame owing to uneven roads and variable loading. Furthermore many of the friction disk drives heretofore produced have required an additional compensating or differential drive mechanism to permit the turning of the vehicle. All these disadvantages are avoided by my invention in a manner now to be disclosed.

Figure 8:
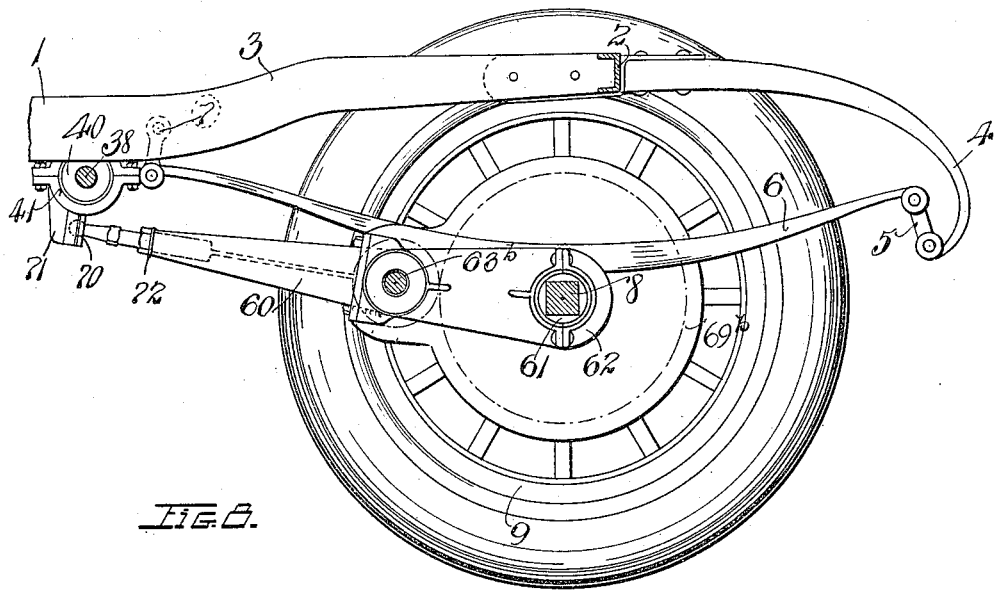
Figure 9:
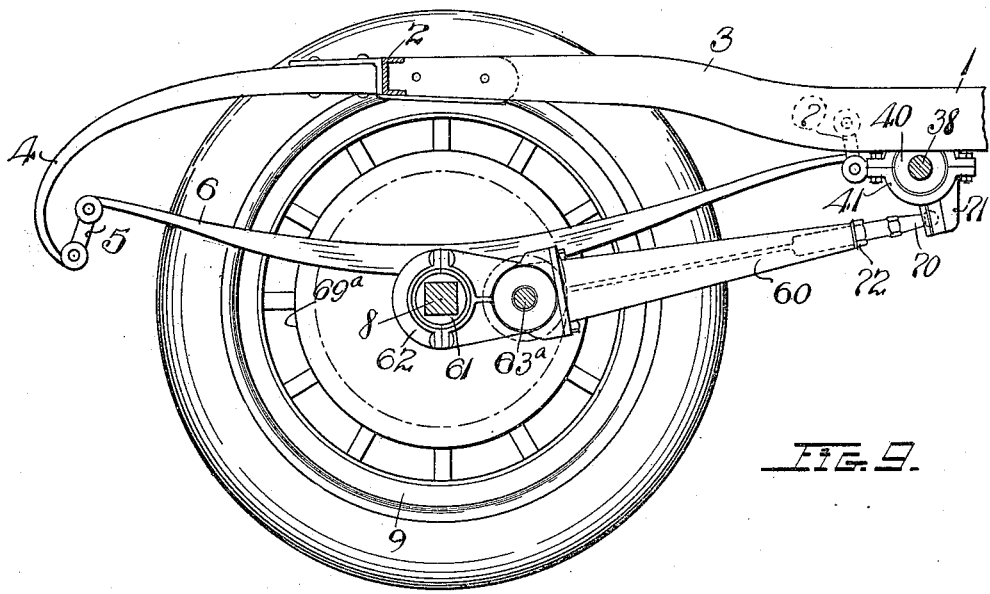

One embodiment of my invention is illustrated in the accompanying drawings in which: Figure 1 is a top plan view of the rear part of the chassis of an automobile showing my improved driving mechanism in elevation; Fig. 2 is an exactly similar view, the driving parts being shown in cross section, and the shifting levers omitted; Fig. 3 is a side elevation of the mechanism for shifting the main shaft, one of the bearings thereof being shown in cross section; Fig. 4 is an end view of the parts shown in Fig. 3 viewed from the right hand end thereof; Fig. 5 is a cross-sectional view of the rear bearing of the main shaft the shaft and rear friction plate being shown in elevation; Fig. 6 is a view, partly in elevation and partly in cross-section, of the pivoted housing in which the ends of the transverse shafts are journaled; Fig. 7 is a side view of the friction drive members and the pivotal housing, one of the friction disks being removed; Fig. 8 is an inside view of one of the rear wheels showing the spring, radius rod, and gear case; Fig. 9 is a corresponding view of the other rear wheel; Fig. 10 is a detail view of the shifting mechanism connection taken on the line 10—10 of Fig. 1; and Fig. 11 is a similar view taken on the line 11—11 of Fig. 1.

Describing the parts by reference characters, the frame of the vehicle is illustrated as composed of longitudinal side members or sills 1 connected by transverse bars or braces 2. The rear parts of the sills are shown as upwardly arched as at 3 and provided with outwardly offset brackets $3^a$ to which are attached the downwardly curved half-springs 4, to which are articulated, by shackles 5, the springs 6, the front ends of which are pivoted to the sills by links 7, in a well known manner. The rear axle 8, herein shown as square in cross section, is secured to these springs in any suitable manner, and wheels 9 are journaled upon the projecting ends thereof. This suspension is not a part of my invention, but illustrates a very simple and efficient construction with which my friction drive is found to give excellent results.

Supported by the transverse bars or braces 2 and extending longitudinally of the vehicle is the main shaft 10 which is operatively connected by any of the usual or suitable universal joint connections with an engine or other power source, not shown. The rear bearing is illustrated at 11, and comprises a hollow spherical member 12, mounted for universal movement in a socket 13, and having within its cylindrical interior the split, internally grooved, ball-bearing ring 14, (see Fig. 5). A continuous, externally grooved ring 15 is slidably mounted on the shaft inside the first ring and is spaced therefrom by the anti-friction balls 16. The end of the member 12 is closed by the plate 17, and a washer 18 of felt or the like reinforced by the metal plates $18^a$ closes the other end of the bearing against dust. It will be seen that the shaft can move longitudinally of this bearing since neither the inner nor the outer ring is fixed in position.

The forward bearing is shown at 19 in Figs. 1 and 2 and is illustrated in detail in Fig. 3. This bearing comprises a sleeve 20 having enlarged ends 21 in which are fitted the split bearing rings 22, which are similar to the rings 14 except that they are made to abut closely against the shoulders 23 at the bottom of the enlargements. Other bearing rings $24^a$ and $24^b$ are sleeved closely upon the shaft and are rotatably mounted in the first rings by the balls 25. Sleeved upon the shaft at one end of this bearing is the thrust ring 26 which abuts the ring $24^a$ on one side and is backed up on the other side by one of the friction plates as illustrated in Fig. 2. The other ring, $24^b$, is engaged upon its outer face by an adjusting nut 27 threaded upon the shaft and backed up by a lock nut 28, the shaft being suitably reduced outside of the threads as at 29. It will thus be seen that, although the rings $24^a$ and $24^b$ are loose upon the shaft, the bearing as a whole is held in fixed position thereon, and that a longitudinal movement given to the bearing will be transmitted to the shaft. The exterior of the sleeve is made cylindrical and is slidably supported in the cylindrically bored, externally spherical, split ring 30, which ring is, in turn, universally supported in the socket member 31 bolted to one of the transverse bars 2. The reduced end 29 of the shaft is formed with an extended keyway 32 whereby the shaft can be secured to the power source in driving relation while retaining the capacity of longitudinal motion. Between the two bearings the shaft 10 is provided with flanges 33 to which are bolted the friction plates 34 and 35, both of which have inwardly facing plane surfaces 36 and are stiffened by radial ribs 37.

Between these plates are mounted the transverse shafts 38 both of which are supported in the same plane as the shaft 10 and are normally in alinement with each other. The outer ends of these shafts are journaled in bearings 39 carried by the sills 1, each of said bearings consisting of a spherical member 40 having a recess extending part way therethrough and having therein an anti-friction bearing, preferably similar to those already described. This member is universally mounted in a cup or socket 41 bolted to the sill.

The inner ends of these shafts are supported in a peculiar form of housing which, together with its mounting will now be described, particular reference being had to Figs. 6 and 7 of the drawing. This housing consists of a Y shaped casting denoted generally by 42 having a stem 43 and branches 44. Each of the branches has bolted thereto a cap 45 and the interior of these branches and of their associated caps are hollowed out as at 46 to form spherical sockets receiving hollow spherical members 47, which are similar in construction and function to the spherical members 40, and likewise carry anti-friction bearings in which are journaled the inner ends of the shafts 38. These shafts are denied longitudinal movement by the ribs or collars 48 which abut the inner bearing rings. The stem of this casting is made exteriorly cylindrical as shown at 49 and is pivotally supported upon a bolt 50 in a similarly shaped socket formed in a supporting member 51. This bolt is supported in a vertical position exactly above (or below) the main shaft 10 and midway between the midposition of the friction plates 34 and 35, with its extended axis cutting a line joining the end bearings 39 of the transverse shafts 38. The two branches of the casting 43 straddle the main shaft and support the inner ends of the transverse shafts in the same plane as the main shaft.

The supporting member 51 may be attached to any rigid part of the frame, but I prefer to provide transverse bars or braces $2^a$ and $2^b$ just inside the planes of the friction plates 34 and 35, and to form the supporting member 51 at the middle point of a beam 52 attached to these braces and parallel to shaft 10.

Friction disks 53 are slidably mounted upon the transverse shafts 38 and are prevented from rotating thereon by means of feathers 54. These disks are of slightly smaller diameter than the distance between the plates 34 and 35, and have friction rims 55 secured thereto, these rims being preferably formed of a special alloy or composition. The shafts 38 also carry sprocket wheels 56 from which power is transmitted to the vehicle wheels by means now to be described.

A radius rod 60 is pivoted upon the rear axle near each end and is connected to the adjacent side sill 1 at a point near one of the bearings 39. Since the rear axle is shown as square, a bushing 61 is employed upon which the end of the radius rod is sleeved and secured by the cap 62. These radius rods are illustrated in Fig. 2, as divided into two forks $61^a$ and $61^b$ for the purpose of providing a greater width at the points $61^c$, and counter-shafts $63^a$ and $63^b$, parallel to the line joining the bearings 39, are journaled in anti-friction bearings 64 at this point. Sprocket wheels 65 are secured to the inner ends of these counter-shafts and are operatively connected to the sprockets 56 by chains 66, while pinions $67^a$ and $67^b$ are secured to the outer ends of these counter-shafts and mesh with large gears $68^a$ and $68^b$ rigidly secured to the vehicle wheels. Inasmuch as the transverse shafts 38 will always revolve in opposite directions and since it is inexpedient and unmechanical to cross the chains, the counter-shafts 63ª and 63ᵇ will also revolve in opposite directions. For the purpose of causing the wheels 9 to revolve in the same direction, an internal gear is employed at 68ª and an external gear at 68ᵇ. These gears have the same pitch diameter and are used with pinions 67ª and 67ᵇ of the same size. The same result could be obtained by the use of external gears in both cases with an idle wheel on one side, but the result would be a loss in simplicity and efficiency, and would cause a difference in the frictional resistance on the two sides of the machine. The counter-shafts 63ª and 63ᵇ are journaled at different distances from the rear axle, as shown, and the gears are inclosed in casings 69ª and 69ᵇ carried by the radius rods and making dust tight contact with the wheel hubs. The forward ends of the radius rods are secured to the frame by ball joints 70 carried by brackets 71 fastened to the sills and having at 72 an adjustable connection with the rods. With this construction it will be seen that the requisite relative movement between the wheels and the frame is permitted without affecting the driving connections between the related sprockets or between the meshing gears, and that the tightness of the chains can be regulated by means of the adjustable connections 72.

It will be convenient at this point to review briefly the operation of the parts thus far described before proceeding to the connection of the controlling levers. For driving the vehicle in a forward direction the shaft 10 is moved longitudinally into one of its endwise positions so as to bring one of the friction plates 34 or 35 into contact with both friction disks which are held by means presently to be described at substantially equal distances from the shaft 10, and are preferably moved to their extreme inward position so as to permit an easy, jarless starting with the smallest slippage between the friction surfaces. If the friction disks be of the same diameter the shafts 38 will be held exactly in line with each other, but if one be worn slightly more than the other, or if the shaft 10 be slightly out of line, the housing 42 will turn slightly about its axis so as to cause the two friction disks to bear with equal pressure upon the friction plate. The spherical mounting of the bearings 39 and 47 permits this movement, which is always of such small extent as not to affect appreciably the running of the chains 66. Of course such a difference in the size of the disks would tend to make a small difference in their relative speed but this difference is taken care of in the same manner as is the difference in speed caused by rounding a curve, namely by allowing a small amount of lost lateral motion between the two disks thus permitting one disk or the other to seek, within limits, that part of the friction plate which is revolving at its own rate. In order to reverse the vehicle it is necessary only to shift the main shaft 10 longitudinally in the opposite direction, thus bringing the other of the friction plates into contact with the opposite side of the disks. This may be done, if necessary, with great rapidity, since it is not necessary to change the lateral position of the disks 55, and since the peripheral slippage of the disks against the plate will prevent an undue shock upon the mechanism.

The mechanism for shifting the shaft 10 is illustrated in Figs. 3 and 4, and comprises trunnions 75 carried by the sleeve 20, and engaged by the slotted ends 76 of the bifurcated lever 77 pivoted at 78 to a hanger 79 carried by the brace 2. The opposite end of this lever is connected by a link 80 to an arm 81 carried by a shaft 82 which is suitably journaled transversely of the frame and adapted to be rocked by the rod or link 83 connected to the usual reverse lever or pedal, not shown. The mechanism for moving the disks along the transverse shafts 38 comprises bell-crank levers 84 pivoted at 85 to one of the cross-bars 2 (and preferably the same as that to which the reversing mechanism is secured), and carrying at their rearward ends the sleeves 86 in which are slidably secured the shanks 87 of yokes 88. The hubs of the friction disks are formed with grooves 89 in which are mounted the split rings 90 having radial trunnions pivoted in the branches of these yokes. The other ends of the bell crank levers are connected by links 91 to arms 92 carried by a transverse shaft 93, mounted and operated similarly to the shaft 82. The connections between the links 91 and the bell-crank levers are preferably by ball and socket joints 94, and adjustable means such as turnbuckles are incorporated in these links in order that the relative positions of the disks can be altered as well as for the purpose of taking up wear.

In order to permit the lost motion above referred to any of the joints connected with the bell-crank levers may be left loose but one of the simplest expedients is to form the rings 90 narrower than the grooves 89. The rings 90 will normally rest in the middle of their respective grooves. In turning a corner, however, the vehicle wheel which is at the inside of the curve will rotate more slowly, and its friction disk will, therefore, be forced inwardly over the friction plate in search of the point of equal velocity and the other disk, having the resistance removed by the wheel traveling faster than the plate will move outwardly to seek a point of equal speed.

While I have illustrated and described my invention as applied to an automobile it is obvious that many features thereof and particularly those concerning the friction drive mechanism are applicable to any vehicle operated by a self-supported motor which actuates the machine through the medium of rotating parts; and in this respect flying machines, launches, locomotives, and trucks will be seen to come within the scope of my idea as well as the particular vehicle herein shown. Furthermore, while I have necessarily described my invention in detail, I do not propose to be limited to such details except as the same may be positively included in the claims hereto annexed or may be rendered necessary by the prior state of the art.

Having thus described my invention, what I claim is:

1. In a self propelled vehicle, in combination, a main shaft, a pair of opposed friction plates carried by said shaft, a transverse shaft between said plates, a friction disk on said transverse shaft and mounted between said plates within the peripheries thereof, a driven wheel operatively connected to said transverse shaft, and means for shifting said main shaft in the direction of its length to bring either of said plates into driving contact with said friction disk for operating said driven wheels in either direction.

2. In a self propelled vehicle, in combination, a main shaft, a pair of opposed friction plates carried by said shaft, a transverse shaft between said plates, a friction disk slidably but not rotatably sleeved on said transverse shaft and mounted between said plates within the peripheries thereof, a driven wheel operatively connected to said transverse shaft, means for shifting said main shaft in the direction of its length to bring either of said plates into driving contact with said friction disk for operating said driven wheels in either direction, and means for shifting said disk along said transverse shaft for varying the speed of such operation.

3. In a self propelled vehicle, in combination, a main shaft, a pair of opposed friction plates carried by said shaft, a transverse shaft on each side of said main shaft between said plates, a friction disk on each of said transverse shafts and mounted between said plates within the peripheries thereof, a pair of driven wheels, means for transmitting the motion of each of said transverse shafts to one of said driven wheels, said means being so designed as to cause said wheels to rotate in the same direction, and means for shifting said main shaft in the direction of its length to bring either of said plates into driving contact with both of said friction disks for rotating said driven wheels in either direction.

4. In a self propelled vehicle, in combination, a main shaft, a pair of opposed friction plates carried by said shaft, a transverse shaft on each side of said main shaft between said plates, a friction disk slidably but non-rotatably sleeved on each of said transverse shafts and mounted between said plates within the peripheries thereof, a pair of driven wheels, means for transmitting the motion of each of said transverse shafts to one of said driven wheels, said means being so designed as to cause said wheels to rotate in the same direction, means for shifting said main shaft in the direction of its length to bring either of said plates into driving contact with both of said friction disks for rotating said wheels in either direction, and means for simultaneously shifting said disks toward and from each other along said transverse shafts for varying the speed of such rotation.

5. In a self propelled vehicle, in combination, a main shaft, a friction plate carried by said shaft, a transverse shaft on each side of said main shaft, a friction disk on each of said transverse shafts and adapted to have its edge brought into contact with the face of said plate, said friction disks being disposed within the periphery of said plate, a driven wheel operatively connected to each of said transverse shafts, and means adapted to automatically equalize the pressure of said disks against said plate.

6. In a self propelled vehicle, in combination, a main shaft, a pair of opposed friction plates carried by said shaft, a transverse shaft on each side of said main shaft, a friction disk on each of said transverse shafts, said disks being disposed between said plates and within the peripheries thereof, a pair of driven wheels having substantially parallel axes, driving connections between each of said transverse shafts and one of said driven wheels, said driving connections being so designed as to cause said wheels to rotate in the same direction, means for shifting said main shaft in the direction of its length so as to bring either of said plates into driving contact with both of said friction disks for rotating said wheels in either direction, and means for equalizing the pressure of said disks against the plate with which they are in contact.

7. In a self propelled vehicle, the combination, with a supporting frame, of a main shaft supported by said frame longitudinally thereof, a friction plate carried by said main shaft, a transverse shaft on each side of said main shaft and in substantially the same plane therewith, a housing having a pair of branches straddling said main shaft and pivoted to said frame about an axis substantially normal to the plane containing said main and transverse shafts, a bearing in each of said branches and receiving the inner end of one of said transverse shafts, a bearing carried by each side of the frame and receiving the outer end of one of said transverse shafts, the bearings for each of said shafts being self-alining, a friction disk on each of said transverse shafts, means for bringing said plate into frictional contact with the peripheries of said disks, and a driven wheel operatively connected to each of said transverse shafts.

8. In a self propelled vehicle, the combination, with a frame having side sills and transverse bars or braces, of universally movable self alining bearings supported by said transverse bars or braces, a main shaft rotatably and slidably mounted in said bearings and held thereby substantially parallel to said side sills, a friction plate carried by said shaft, a transverse shaft on each side of said main shaft, a bearing for the outer end of one of said transverse shafts carried by each of said sills, a branched member pivotally supported by said frame between said last bearings, the pivotal axis of said member intersecting the center of said main shaft and also intersecting a line connecting said last bearings, bearings for the inner ends of said transverse shafts carried by the branches of said member, friction disks carried by said shafts and adapted to be brought into driving engagement with said plate, and a driven wheel operatively connected to each of said transverse shafts.

9. In a self-propelled vehicle, the combination, with a frame having side sills and transverse bars or braces, of hollow sockets carried by said transverse bars or braces and disposed in substantial alinement with each other, hollow complementary members in said sockets, a main shaft journaled in said members and mounted for reciprocation therein, oppositely facing friction plates carried by said shaft, transverse shafts carried by said frame between said plates, friction disks on said transverse shafts adapted to make driving contact with said plates, driven wheels operatively connected to said transverse shafts, means for driving said main shaft, and means for shifting said main shaft in the direction of its length to bring either of said plates into driving contact with both of said disks.

10. In a self-propelled vehicle, the combination, with a frame having side sills and transverse bars or braces, of a main shaft parallel to said sills, a self-alining bearing in which the rear end of said shaft is rotatably and slidably supported, a second bearing for the forward end of said shaft, said second bearing comprising a socket having a spherical interior, a ring universally mounted in said socket, a sleeve slidably mounted in said ring and having antifriction bearings supporting said shaft, means for preventing movement of said sleeve along said shaft, means for reciprocating said sleeve in said ring, and driven wheels operatively connected to said shaft.

11. In a device of the character described, the combination, with a frame, and driven wheels carried by said frame, of a main shaft, a bearing for said shaft, said bearing comprising a sleeve having a cylindrical exterior and enlarged ends, an internally cylindrical, externally spherical, split ring slidably embracing the cylindrical portion of said sleeve, an interiorly spherical socket universally embracing said ring and attached to said frame, means for reciprocating said sleeve in said ring, and means for transmitting the motion of said shaft to said driven wheels.

12. In a self-propelled vehicle, the combination, with a main shaft and a friction plate thereon, of a sleeve surrounding said shaft and having interiorly enlarged ends with an exteriorly cylindrical portion between said ends, the inner ends of such enlargements being formed with abrupt shoulders, bearing rings fitted within said enlargements and seated against said shoulders, a complementary bearing ring sleeved upon said shaft inside each of said first rings, antifriction devices between said rings, a thrust collar between one of said inner rings and said friction plate, a thrust nut engaging the other of said inner rings, and means slidably engaging the cylindrical portion of said sleeve.

13. In a self-propelled vehicle, with a non-rigid frame, the combination, with a main shaft and a sleeve rotatably journaled thereon, said sleeve being universally and slidably supported by said frame, of a bearing for the end of the main shaft, said bearing comprising a spherical member having a cylindrical bore, an interiorly spherical socket embracing said member, a bearing ring slidably mounted in said bore, a second bearing ring slidably mounted on said shaft inside said first ring, and anti-friction members between said rings and permitting swiveling movement while preventing shifting movement between the two rings.

14. In a self-propelled vehicle, the combination, with a frame and a main shaft mounted longitudinally thereof, of a pair of transverse shafts carried by said frame, a bearing for each end of each of said transverse shafts, each of said bearings comprising a spherical member having a cylindrical bore, a spherical socket embracing said member and supported from said frame, and an anti-friction bearing in said bore and supporting said shaft, means for transmitting the motion of the main shaft to the transverse shafts, and driven wheels operatively connected to said transverse shafts.

15. In a self-propelled vehicle, the combination, with a frame and a main shaft mounted longitudinally thereof, of a pair of transverse shafts carried by said frame, a bearing for each end of each of said transverse shafts, each of said bearings comprising a spherical member having a cylindrical bore extending inwardly from one side thereof and terminating short of the other side thereof, a spherical socket embracing said member and supported from said frame, an antifriction bearing in said bore and supporting said shaft, a dust washer mounted in the open end of said bore and closely embracing said shaft, means for transmitting the motion of the main shaft to the transverse shafts, and driven wheels operatively connected to said transverse shafts.

16. In a transmission device of the friction disk type, the combination, with a main shaft and a friction plate thereon, of a pair of transverse shafts radiating from said main shaft, friction disks carried by said transverse shafts adapted to make contact with said plate, a bearing for each end of each of said transverse shafts, each of said bearings comprising a spherical member having a cylindrical bore, antifriction bearings in said bore and supporting the end of a shaft, and spherical sockets embracing said members, the bearings at the inner ends of said transverse shafts being relatively shiftable to equalize the pressures of said disks upon said plate.

17. In a transmission device of the friction disk type, the combination, with a main shaft and a friction plate thereon, of a bearing support on each side of said shaft, transverse shafts having their inner ends journaled in said bearing supports and their outer ends suitably journaled in other bearings, all said bearings being of the self alining type, friction disks mounted on said transverse shafts and adapted to be brought into driving contact with said plate, and balancing means connecting said first two bearing supports for equalizing the pressures of said disks upon said plate.

18. In a transmission device of the friction disk type, the combination, with a main shaft and a friction plate thereon, of a member pivoted upon an axis perpendicular to the axis of the shaft and having a branch extending on each side of said shaft, bearings in said branches, a pair of transverse shafts each having its inner end journaled in one of said bearings and having its outer end suitably supported in another bearing, all of said bearings being of the self alining type, friction disks on said transverse shafts, and means for moving said plate and pivoted member relatively to each other whereby the edges of said disks may be brought into driving contact with the face of said plate.

19. In a self-propelled vehicle, in combination, a main shaft, a friction plate carried by said main shaft, a transverse shaft on each side of said main shaft, a friction disk slidably but non-rotatably sleeved on each of said transverse shafts, a pair of driven wheels, means for transmitting the motion of each of said transverse shafts to one of said driven wheels, and a bell-crank lever pivoted at each side of said main shaft and each having one of its ends swiveled to the hub of each disk, and controlling means articulated to the other ends of said levers whereby they may be actuated to vary the relative speed of said main and transverse shafts.

In testimony whereof, I hereunto affix my signature in the presence of two witnesses.

ALONZO W. HALL.

Witnesses:
J. B. HULL,
ALBERT H. BATES.

Copies of this patent may be obtained for five cents each, by addressing the "Commissioner of Patents, Washington, D. C."